United States Patent
Cottignies et al.

(10) Patent No.: US 7,939,182 B2
(45) Date of Patent: May 10, 2011

(54) FILLER WIRE FOR WELDING ALUMINUM ALLOYS

(75) Inventors: Laurent Cottignies, Poisat (FR); Claudine Strippoli Gerin, Tullins (FR); Philippe Jarry, Grenoble (FR); Christine Henon, Claix (FR); Christophe Sigli, Grenoble (FR)

(73) Assignee: Aluminium Pechiney, Paris (FR)

( * ) Notice: Subject to any disclaimer, the term of this patent is extended or adjusted under 35 U.S.C. 154(b) by 835 days.

(21) Appl. No.: 11/575,046

(22) PCT Filed: Aug. 31, 2005

(86) PCT No.: PCT/FR2005/002172
§ 371 (c)(1),
(2), (4) Date: Sep. 25, 2007

(87) PCT Pub. No.: WO2006/030087
PCT Pub. Date: Mar. 23, 2006

(65) Prior Publication Data
US 2008/0193792 A1    Aug. 14, 2008

(30) Foreign Application Priority Data

Sep. 10, 2004 (FR) .................... 04 09592

(51) Int. Cl.
| | |
|---|---|
| B32B 15/20 | (2006.01) |
| B32B 15/04 | (2006.01) |
| B23K 103/10 | (2006.01) |

(52) U.S. Cl. ............... 428/654; 219/137 R; 219/146.1; 148/524; 148/535

(58) Field of Classification Search ................. None
See application file for complete search history.

(56) References Cited

U.S. PATENT DOCUMENTS 5,122,339 A * 6/1992 Pickens et al. ............... 420/533
2005/0103406 A1* 5/2005 Zhao et al. .................... 148/535

FOREIGN PATENT DOCUMENTS

JP         09-174239      *  8/1997

* cited by examiner

*Primary Examiner* — Jennifer C McNeil
*Assistant Examiner* — Jason L Savage
(74) *Attorney, Agent, or Firm* — Banner & Witcoff, Ltd.

(57) ABSTRACT

An aluminum-based welding filler wire is made with an aluminum alloy that contains between 0.1 and 6 wt. % titanium, including one portion in the form of $TiB_2$ particles, $TiC$ particles, or a combination thereof, and another portion in the form of free titanium. The filler wire can be used in welding aluminum-based materials.

23 Claims, No Drawings

FILLER WIRE FOR WELDING ALUMINUM ALLOYS

CROSS-REFERENCE TO RELATED APPLICATIONS

The present application is a U.S. National Filing of PCT WO 2006/030087, filed Aug. 31, 2005, and claims priority thereto and the benefit thereof, which application is incorporated herein by reference and made a part hereof.

TECHNICAL FIELD OF THE INVENTION

This invention relates to filler wires for welding aluminum alloys.

BACKGROUND OF THE INVENTION

In the field of welding aluminum alloys, it is known that the growth of coarse grains is detrimental because it can cause cracks and "hot tearing." One of the methods for preventing the growth of coarse grains is the addition of zirconium or titanium to the filler wire (welding wire). A typical filler wire for welding aluminum alloy parts is an aluminum alloy wire with a diameter typically between 0.8 and 3.2 mm, which contains the chemical elements to be provided in the welded joint. In this context, the base of the alloy of the wire, which is chosen for its metallurgical compatibility with the products to be welded, should be distinguished from additives the role of which is to modify the solidification structure of the welded joint. The base of the alloy of the filler wire must make it possible to obtain a welded area with high mechanical strength. But it is in particular the solidification of the welded joint that can cause defects, some of which will be immediately visible, while others appear only after a certain period of use of the welded construction.

For a given welding procedure, and on the condition that this procedure does not in itself cause welding defects (that it is therefore performed according to good practice), the influence of the chemical composition of the filler wire on certain properties of the weld bead can therefore be significant.

The article "Effects of grain refinement of aluminum weldability," by M. J. Dvornal, R. H. Frost and D. L. Olson, published in Weldability of Materials, ASM International (1990), teaches that these additive elements are effective only if they are in the form of intermetallic phases of the $TiAl_3$ or $ZrAl_3$ type. U.S. Pat. No. 5,104,456 (Colorado School of Mines) describes a method for producing a filler wire that contains these phases with a controlled shape, morphology and particle size distribution.

The patent application EP 1 249 303 A1 (McCook Metals L.L.C.) describes an aluminum-based welding filler wire containing zirconium and/or titanium in a concentration greater than 0.25%, which can also contain the elements Sc, Hf, V, Mn, Cu, Fe and Si. This wire was developed for fusion welding of alloy AA2195 (Al—Cu—Li alloy).

In alloy AA2090 (also Al—Cu—Li type), it was noted that the addition of Ti, Zr or Ti+B to filler wires made of alloy 2319 or 4043 caused refinement of the grain in the welded area, which makes it possible to reduce hot cracking in the welding of parts made of alloy 2219. The best results are obtained with zirconium alone in an amount of around 0.18% as described in "Use of inoculants to refine weld solidification structure and improve weldability in type 2090 Al—Li alloy," by G. D. Janaki Ram et al., published in the journal Materials Science and Engineering A276 (2000), p. 48-57.

The patent application EP 0 238 758 (Martin Marietta) describes a method for welding metal matrix composites in which the weld or the filler wire are prepared by in situ precipitation of a ceramic material in a metal matrix. In the case of an aluminum-$TiB_2$ composite, the presence of free titanium is not encouraged because it can have a detrimental effect on the viscosity of the liquid metal for the casting operation.

In the field of aluminum alloy casting, the use of refining wires, aluminum alloy wires containing titanium additives, is also known. These wires are typically available in a diameter of 9.5 mm. A wire commonly used for refining aluminum alloys is an alloy containing 5% Ti and 1% B, which contains particles of $TiB_2$ and free titanium. Free titanium, as used herein, refers to titanium not combined with boron, but possibly combined with aluminum in the form of $Al_3Ti$.

The present disclosure is provided to solve the problem discussed above and other problems, and to provide advantages and aspects not provided by prior welding, filler wires and welding methods of this type. For example, the present disclosure provides welding filler wires that make it possible, by comparison with prior welding wires, to achieve better refining in the weld bead, i.e. a finer and more regular grain, and which simultaneously make it possible to obtain good mechanical strength in the welded joint.

A full discussion of the features and advantages of the present invention is deferred to the following detailed description.

SUMMARY OF THE INVENTION

The present disclosure provides an aluminum-based welding filler wire containing between 0.3 and 6% titanium, including a portion of the titanium in the form of TiB2 and/or TiC particles, and a portion of the titanium in the form of free titanium.

The present disclosure also provides a fusion welding method for welding aluminum or an aluminum alloy, in which an aluminum-based filler wire that contains TiB2 and/or or TiC particles is used.

The present disclosure further provides a welded construction characterised in that at least one of its weld beads comprises $TiB_2$ and/or TiC particles.

Other features and advantages of the invention will be apparent from the following detailed description.

DETAILED DESCRIPTION OF THE INVENTION

Terminology

Unless otherwise indicated, all indications relating to the chemical composition of the alloys are expressed as weight percents. The alloys are identified according to the rules of The Aluminum Association, known to a person skilled in the art. The metallurgical states are defined in European standard EN 515. The chemical composition of standardized aluminum alloys is defined, for example, in standard EN 573-3. The grain size was measured with the intercept method.

Unless otherwise indicated, the definitions of the European standard EN 12258-1 apply. The term "sheet" is used here for rolled products of any thickness.

Description

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

In one exemplary embodiment, an aluminum-based filler wire is made from an aluminum alloy that contains titanium, where a first portion of the titanium is in the form of $TiB_2$ particles, TiC particles, or a combination thereof, and a second portion of the titanium is in the form of free titanium. In one embodiment, the total titanium content of the wire is between 0.3% and 6%. A portion of this titanium is free titanium, i.e. not combined with boron or carbon. In one embodiment, the total free titanium content in the filler wire is between 0.05% and 2.5%, so that the free titanium content of the bead does not exceed 0.80% (in consideration of the dilution during welding, as the bead is formed by solidification of a liquid metal mixture constituted by the filler wire metal diluted in the metal of the parts to be welded). In another embodiment, the total free titanium content in the filler wire is between 0.10% and 1%. In a further embodiment, the total free titanium content in the filler wire is between 0.10% and 0.5%. In all of these embodiments, the total titanium content preferably does not exceed 6% and a titaniumcontent between 1% and 6% is generally suitable.

If the filler wire contains too much free titanium, the formation of Al3Ti-type primary coarse phases is observed in the weld bead. A free titanium content below 0.05% does not result in a fine enough grain size.

The base alloy of the filler wire can be an Al—Mg-type alloy, for example an alloy that satisfies the standards for composition of standardised alloys AA5183, AA5356 or AA5556 or AA5087, to which the elements Ti, B and C are added so as to form $TiB_2$ and/or TiC phases in the desired amount and particle size distribution. The particle size is preferably characterised by either a restricted distribution of nucleus sizes or a low proportion of fine particles. In one embodiment, the wire contains $TiB_2$ and/or TiC particles so that the boron content is 0.05%-2.0% and/or the carbon content is 0.05%-1.0%.

In one exemplary embodiment, which may be used, for example, in welding products made of alloys of the 5xxx series, the filler wire contains the following (in % by weight): a
Mg content of 3.0-5.5%; a Mn content of 0.05-1.0%; a Cr content of 0-0.25%; a Fe content of 0-0.50%; a Cu content of 0-0.10%; a Si content of 0-0.50%; a Zn content of 0-0.25%; a V content of 0-0.25%; a Ti content of 0.3-10.0%; a Zr content of 0-0.25%; and a Be content of 0-0.0008%.

In some embodiments, which can be combined, the Mg content of the filler wire is between 4.0% (4.3 in one embodiment) and 5.2%, the Cr content is between 0.05 and 0.20%, and the Be content does not exceed 0.0005%. In another embodiment, the Be content does not exceed 0.0003% because the standards applicable to welding filler wires (for example the standard EN 18273) tend to limit the beryllium content to 0.0003%.

These Al—Mg-alloy welding wires according to the invention are suitable for welding many different types of alloys, including alloys of the 5xxx series, the 6xxx series, and copper-free alloys of the 7xxx series.

The filler wire can also be produced with a base alloy of type 1xxx, 2xxx, 3xxx and 4xxx. One exemplary embodiment uses a base alloy containing between 4 and 13% silicon, and (optionally) magnesium in an amount of 0.10 to 0.50%. For this embodiment, the base alloy can be selected from the group consisting of alloys AA4043, AA4043A, AA4643, AA4145, AA4145A, AA4047, AA4047A, AA4147, AA4009 and AA4010.

As stated above, in some embodiments, the total titanium content of the base alloys is between 1 and 6%. The particle size can be characterised by either a restricted distribution of nucleus sizes or a low proportion of fine particles.

The filler wire made of an alloy of series 1xxx, 2xxx and 3xxx can be used advantageously for welding products of the same family as the filler wire between them. The filler wire made of an alloy of series 4xxx can be used for many other applications as well. In one embodiment, the use of the filler wire for fusion welding aluminum or an aluminum alloy results in a weld bead characterized by an average grain size that is smaller than with a filler wire according to the prior art. In one embodiment, the grain size at the center of the bead (core) obtained with this method is typically smaller than 80 µm, smaller than 40 µm in another embodiment, and smaller than <25 µm in a further embodiment. In these embodiments, the grain size is preferably as homogeneous as possible between the centre of the bead and the periphery.

The technical effect of the invention, namely the refining of the grain of the weld bead, is observed in the presence of $TiB_2$ and/or TiC particles. The latter probably act as nucleation sites. By way of example, a wire composed of 1.6% Ti and 1.4% B, known as a refining wire, which contains essentially particles of $AlB_2$, has no effect on the grain size of the welded joint. The presence and the particle size distribution of the $TiB_2$ and TiC particles in the wire according to the invention or in the weld bead of a welded construction according to the invention can be determined by means of scanning electron microscopy (SEM), preferably using a field-effect gun (FEG).

The presence of an excess of free Ti in the wire leads to the formation of undesirable $Al_3Ti$ precipitates in the weld beads. For this reason, it is desirable to limit the free Ti content of the wire.

In addition, in some embodiments, it is desirable for the particle size of the $TiB_2$ and TiC particles to be controlled, such that the wire contains either a restricted distribution of particle sizes or a small proportion of fine particles (<2 µm), so as to prevent the formation of particle beds in the weld beads.

The disclosed filler wire can be used for all fusion welding techniques, such as MIG, TIG or laser welding, and can be used to weld aluminum-based materials, including aluminum and aluminum alloys. Generally, such welding techniques include providing a filler wire as described herein and welding the aluminum-based material using the filler wire. One advantageous example for laser welding is the welding of a sheet made of AA6056 with a wire based on AA4047.

The invention can be better understood with the following examples, which are in no way limiting.

EXAMPLES

Eight refining wires with a diameter D of around 9.5 mm, available on the market, were drawn to a final diameter of 3.2 mm. No intermediate annealing was necessary. The drawing was followed by an annealing operation of 3 hours at 350° C. The wires were then stranded and cut into rings 800 mm in length, and finally degreased. Table 1 describes the refining wires. Table 2 describes the drawing process used. Wires of AA5183 and AWS 1100 were used as a reference.

TABLE 1

Composition of wires

| Reference | Composition | Microstructure | Free Ti |
|---|---|---|---|
| AT5B | Ti 5.3%, B 1.1%, Si 0.06%, Fe 0.15%, V 0.05% | Al<br>Al combined with Ti(Al$_3$Ti) + Ti combined with B(TiB$_2$) | 2.9% |
| AT5B0.2 | Ti 5.0%, B 0.2%, Si 0.06%, Fe 0.17% | Al<br>Al combined with Ti(Al$_3$Ti) + Ti combined with B(TiB$_2$) | 4.6% |
| AlTiC | Ti 3%, C 0.15%, Si 0.06%, Fe 0.17%, V 0.15% | Al<br>Al combined with Ti(Al$_3$Ti) + Ti combined with C(TiC) | 2.4% |
| AlT1.2B0.5 | Ti 1.2%, B 0.5%, Si 0.06%, Fe 0.12%, V 0.02% | Al<br>Ti combined with B(TiB$_2$) | 0.1% |
| AlT1.6B1.4 | Ti 1.6%, B 1.4% | Al + Al combined with B(AlB$_2$) + Ti combined with B(TiB$_2$) | |
| AlTi6 | Ti 5.7%, Si 0.07%, Fe 0.17%, V 0.05% | Al + Al combined with Ti(Al$_3$Ti) | 5.7% |
| AA5183 | Standardised reference composition | | |
| AA1100 | Max. content: Si 0.30, Fe 0.40, Cu 0.05, Mn 0.05, Mg 0.05, Zn 0.07, Ti 0.05 | | |

TABLE 2

Drawing process

| | | Drawing step | | | | | | | | |
|---|---|---|---|---|---|---|---|---|---|---|
| | | 1 | 2 | 3 | 4 | 5 | 6 | 7 | 8 | 9 |
| D [mm] | 9.5 | 8.35 | 7.2 | 6.4 | 5.5 | 5.13 | 4.45 | 3.91 | 3.46 | 3.2 |
| Cross-section reduction [%] | | 22.7 | 25.6 | 21.0 | 26.1 | 13.0 | 24.8 | 22.8 | 21.7 | 14.5 |

We prepared parts with a thickness of 3 mm using sheets made of alloy AAA5088 in state H111 with an initial thickness of 8 mm by surfacing. After brushing of the edges, they were manually welded in TIG mode according to the same procedure for each wire. The process conditions were:

Welding speed: 100 mm/min
Welding current (current control): around 80 A, alternating current
Pure argon gas
Nozzle diameter 12 mm, electrode diameter 3 mm.

The beads were characterised by micrographic analysis. The refining effect was estimated by the grain size and the homogeneity of the granular structure in the bead and along the weld. Five samples were taken in the length of the bead in order to assess the microstructure and the homogeneity of the granular structure. The following observations were made:

a) In beads welded with wire AT5B and with wire AT5B0.2, we find Al$_3$Ti phases in the form of primary coarse grains (≈30 μm) and TiB$_2$, probably originally present in the refining wire. We also note the presence of clusters, which appear to be constituted by TiB$_2$ particles, making the microstructure heterogeneous.

b) In the beads welded with the AlTiC wire, we find the Al$_3$Ti phase in the form of primary coarse grains.

c) In the beads welded with the AlT1.2B0.5 wire, we find the TiB$_2$ phase, but better distributed in the microstructure than in AT5B and AT5B0.2.

d) In the beads welded with the AlT1.6B1.4 wire, we find TiB$_2$ precipitates, but better distributed in the microstructure than in AT5B and AT5B0.2. The AlB$_2$ phase is probably present, but could not be clearly identified.

e) In beads welded with the AlTi6 wire, we find the Al$_3$Ti phase, with its precipitation in the form of coarse primary phases as observed in the other samples, but also in the form of clusters of thin rods.

The grain size in the weld bead was estimated by the intercepts method. The results are shown in Table 3.

TABLE 3

| | References of wires used | | | | | | |
|---|---|---|---|---|---|---|---|
| | 1100 | 5183 | AT1.6B1.4 | AlTiC | AT5B | AT1.2B0.5 | AT5B0.2 | AlTi6 |
| Core | 800 | 150 | 800 | 20 | 12 | 16 | 11 | 25 |
| Periphery | 50 | 150 | 50 to 300 | 40 to 50 | 12 | 16 | 30 | 50 to 70 |

It is noted that:

a) The use of refining elements such as AlTi6, AlTiC, AT5B, AT1.2B0.5 and AT5B0.2 reduced the grain size.

b) The wire AT1.6B1.4 had no effect on the grain size (by comparison with the bead obtained with wire 1100).

c) The welded beads produced with AT5B and AT5B0.2 had a small grain size. However, micrographic examinations after anodic oxidation showed the presence at the top of the bead of coarser grains as well as the presence of dark areas (certainly corresponding to the $TiB_2$ clusters) making the structure of the entire bead heterogeneous.

d) The beads welded with AT5B and AlTi6 were not homogeneous throughout the length of the sheet, and had coarser grains at the periphery of the HAZ.

In view of all of these results, it appears that:

a) The presence of $TiB_2$ or TiC precipitates leads to significant refining of the bead, but not $AlB_2$ precipitates.

b) The presence of free titanium also leads to refining of the grain in the bead, but this effect is less notable than that obtained with the $TiB_2$ or TiC precipitates (comparison of AlTi6 wire with AlT5B wire).

c) An excess of free titanium in the welding wire causes the formation of primary coarse grain precipitates in the weld bead (comparison of AT5B and AT5B0.2 with AT1.2B0.5).

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," etc., as used herein, are intended for illustrative purposes only and do not limit the embodiments in any way. Accordingly, while the specific embodiments have been illustrated and described, numerous modifications come to mind without significantly departing from the spirit of the invention and the scope of protection is only limited by the scope of the accompanying claims.

The invention claimed is:

1. An aluminum-based welding filler wire, comprising:
an aluminum alloy containing 0.3 to 6 wt. % titanium, wherein a first portion of the titanium is in the form of TiC particles, and a second portion of the titanium is in the form of free titanium, wherein the total free titanium content of the wire is 0.05 to 2.5 wt. %.

2. A filler wire according to claim 1, further comprising at least one of boron having a content of 0.05 to 2.0 wt. % and carbon having a content of 0.05 to 1.0 wt. %.

3. A filler wire according to claim 1, further comprising:
Mg having a content of 3.0 to 5.5 wt. %;
Mn having a content of 0.05 to 1.0 wt. %;
Cr having a content of 0 to 0.25 wt. %;
Fe having a content of 0 to 0.50 wt. %;
Si having a content of 0 to 0.5 wt. %;
Zn having a content of 0 to 0.25 wt. %;
V having a content of 0 to 0.25 wt. %;
Zr having a content of 0 to 0.25 wt. %; and
Be having a content of 0 to 0.0008 wt. %.

4. A filler wire content to claim 3, wherein the Mg content is 4.0 to 5.2 wt. %.

5. A filler wire according to claim 4, wherein the Mg content is 4.3 to 5.2 wt. %.

6. A filler wire according to claim 3, wherein the Cr content is 0.05 to 0.25 wt. %.

7. A filler wire according to claim 3, wherein the Be content does not exceed 0.0003 wt. %.

8. A filler wire according to claim 1, wherein the aluminum alloy is selected from the group consisting of alloys AA5183, AA5356, AA5556 and AA5087.

9. A filler wire according to claim 1, wherein the aluminum alloy contains 4 to 13 wt. % silicon.

10. A filler wire according to claim 9, wherein the aluminum alloy contains 0.10 to 0.50 wt. % magnesium.

11. A filler wire according to claim 1, wherein the aluminum alloy is selected from the group consisting of alloys AA4043, AA4043A, AA4643, AA4145, AA4145A, AA4047, AA4047A, AA4147, AA4009 and AA4010.

12. A filler wire according to claim 1, wherein the alloy contains 0.05 to 1 wt. % free titanium.

13. A filler wire according to claim 12, wherein the alloy contains 0.10 to 0.5 wt. % free titanium.

14. A filler wire according to claim 1, wherein the titanium content of the wire is 1 to 6 wt. %.

15. A filler wire according to claim 1, wherein an additional portion of the titanium is in the form of $TiB_2$ particles.

16. A method for fusion welding an aluminum-based material, comprising:
providing an aluminum-based welding filler wire comprising an aluminum alloy containing 0.3 to 6 wt. % titanium, wherein a first portion of the titanium is in the form of TiC particles, and a second portion of the titanium is in the form of free titanium, wherein the total free titanium content of the wire is 0.05 to 2.5 wt. %; and
welding the aluminum-based material using the filler wire.

17. A method according to claim 16, wherein the aluminum alloy contains 0.05 to 1 wt. % free titanium, and the titanium content of the wire is 1 to 6 wt. %.

18. A method according to claim 16, wherein an additional portion of the titanium is in the form of $TiB_2$ particles.

19. A welded construction formed using the method according to claim 16, comprising a weld bead, wherein the weld bead contains titanium in the TiC particles.

20. A welded construction according to claim 19, wherein the average grain size at a center of the weld bead is smaller than 80 μm.

21. A welded construction according to claim 19, wherein the average grain size at a center of the weld bead is smaller than 40 μm.

22. A welded construction according to claim 19, wherein the average grain size at a center of the weld bead is smaller than 25 μm.

23. A welded construction according to claim 19, wherein the weld bead further contains titanium in the form of $TiB_2$ particles and in free form.

* * * * *